United States Patent
Ito et al.

(10) Patent No.: US 9,379,370 B2
(45) Date of Patent: Jun. 28, 2016

(54) ELECTRIC STORAGE ELEMENT AND METHOD FOR MANUFACTURING THE SAME

(75) Inventors: Syun Ito, Kyoto (JP); Shogo Waki, Kyoto (JP); Yu Shiraishi, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 199 days.

(21) Appl. No.: 13/982,744

(22) PCT Filed: Jan. 24, 2012

(86) PCT No.: PCT/JP2012/051423
§ 371 (c)(1),
(2), (4) Date: Jul. 30, 2013

(87) PCT Pub. No.: WO2012/105371
PCT Pub. Date: Aug. 9, 2012

(65) Prior Publication Data
US 2013/0316225 A1    Nov. 28, 2013

(30) Foreign Application Priority Data

Jan. 31, 2011  (JP) .................................. 2011-018746
Jan. 31, 2011  (JP) .................................. 2011-019137

(51) Int. Cl.
| | |
|---|---|
| *H01M 2/22* | (2006.01) |
| *H01M 2/02* | (2006.01) |
| *H01M 2/04* | (2006.01) |
| *H01M 2/12* | (2006.01) |
| *H01M 2/30* | (2006.01) |

(52) U.S. Cl.
CPC ................ *H01M 2/22* (2013.01); *H01M 2/024* (2013.01); *H01M 2/043* (2013.01); *H01M 2/1241* (2013.01); *H01M 2/305* (2013.01); *H01M 2/307* (2013.01); *Y10T 29/49108* (2015.01)

(58) Field of Classification Search
CPC ... H01M 2/024; H01M 2/043; H01M 2/1241; H01M 2/307; H01M 2/22; Y10T 29/49108
See application file for complete search history.

(56) References Cited

U.S. PATENT DOCUMENTS

| | | |
|---|---|---|
| 2006/0234120 A1 | 10/2006 | Hamasaki et al. |
| 2008/0038627 A1 | 2/2008 | Yamauchi et al. |
| 2008/0182166 A1 | 7/2008 | Aota et al. |
| 2008/0213657 A1 | 9/2008 | Qi et al. |

(Continued)

FOREIGN PATENT DOCUMENTS

| | | |
|---|---|---|
| CN | 1841821 A | 10/2006 |
| JP | S43-10657 Y | 5/1943 |

(Continued)

OTHER PUBLICATIONS

English translation of JP Publication 2009-277605, Nov. 2009.*

(Continued)

*Primary Examiner* — Brittany Raymond
(74) *Attorney, Agent, or Firm* — McGinn IP Law Group, PLLC.

(57) ABSTRACT

An electric storage element has a casing, a power generating element arranged inside the casing, a current collector, and a connection member. The current collector is connected to the power generating element and directly fixed to the casing. The connection member penetrates through the casing without a clearance and is connected to the current collector.

17 Claims, 10 Drawing Sheets

(56) References Cited

U.S. PATENT DOCUMENTS

2011/0159323 A1* 6/2011 Kim .................................. 429/7
2012/0148909 A1   6/2012 Ito et al.

FOREIGN PATENT DOCUMENTS

| | | | |
|---|---|---|---|
| JP | 2003-022796 | A | 1/2003 |
| JP | 2004-014173 | A | 1/2004 |
| JP | 2004-111300 | * | 4/2004 |
| JP | 2004-111300 | A | 4/2004 |
| JP | 2008-066254 | A | 3/2008 |
| JP | 2008-084665 | A | 4/2008 |
| JP | 2008-532235 | A | 8/2008 |
| JP | 2008-269851 | A | 11/2008 |
| JP | 2009-277605 | * | 11/2009 |
| JP | 2009-277605 | A | 11/2009 |

OTHER PUBLICATIONS

English translation of JP Publication 2004-111300, Apr. 2004.*
International Search Report (ISR) (PCT Form PCT/ISA/210), in PCT/JP2012/051423, dated Apr. 24, 2012.
United States Office Action dated Mar. 23, 2016 in U.S. Appl. No. 13/953,683.

* cited by examiner

ELECTRIC STORAGE ELEMENT AND METHOD FOR MANUFACTURING THE SAME

This is a national phase application in the United States of International Patent Application No. PCT/JP2012/051423 with an international filing date of Jan. 24, 2012, which claims priorities of Japanese Patent Application No. 2011-018746 filed on Jan. 31, 2011 and Japanese Patent Application No. 2011-019137 filed on Jan. 31, 2011, the contents thereof are incorporated herein by reference.

TECHNICAL FIELD

The present invention relates to an electric storage element and a method for manufacturing the same.

BACKGROUND ART

As a nonaqueous electrolyte secondary battery that exemplifies an electric storage element, there is known a secondary battery that includes a power generating element, a current collector connecting plate electrically connected to the power generating element, a terminal electrically connected to the current collector connecting plate, a battery case that houses the power generating element and the current collector connecting plate, and a cover plate through which the terminal penetrates, the current collector connecting plate being caulking-fixed by the terminal and the cover plate (for example, see JP 2004-111300 A).

SUMMARY OF THE INVENTION

Technical Problem

However, in the conventional nonaqueous electrolyte secondary battery, the cover plate and the current collector connecting plate are not fixedly connected, and stress due to vibration or the like is easily concentrated on the terminal holding the current collector connecting plate connected to the power generating element. For this reason, a clearance is formed in a boundary portion between the terminal penetrating through the cover plate and the cover plate, and therefore internal gas may disadvantageously leak. In the electric storage element such as a nonaqueous electrolyte secondary battery, since gastightness is particularly important, this problem cannot be overlooked.

Thus, an object of the present invention is to provide an electric storage element in which stress is not easily concentrated on a member penetrating through a casing even in a simple configuration, and a method for manufacturing the same.

Solution to Problem

According to the present invention, as a means for solving the problem, there is provided an electric storage element comprising, a casing, a power generating element arranged inside the casing, a current collector connected to the power generating element, and a connection member penetrating through the casing without a clearance and connected to the current collector, wherein the current collector is directly fixed to the casing.

With this configuration, even though stress due to vibration or the like is concentrated on the connection member, since the connection member is connected to the current collector directly fixed to the casing, positional deviation or the like does not easily occur. Thus, a clearance is not easily formed between an external terminal and the casing to make it possible to reduce the possibility of leaking gas from the inside.

The current collector is preferably fixed to the casing by welding.

In this case, the current collector is preferably fixed to the casing by welding together with a welding pad.

With the configuration, the fixing state can be made stronger such that the current collector is welded together with the welding pad in comparison with a case where a current collector is simply welded on a casing.

The welding pad need only have an independent configuration.

The casing has a substantially rectangular parallelepiped shape and includes a cover configuring one surface and a storage case configuring the other surfaces, the connection member may penetrate through the cover, the current collector may be fixed to the cover, and the welding pad may be configured by a part of the cover.

With the configuration, the current collector can be connected to the cover without additionally arranging a welding pad, and workability can be improved.

The casing has a substantially rectangular parallelepiped shape and includes a cover configuring one surface and a storage case configuring the other surfaces, the connection member preferably penetrates through the cover, the current collector is preferably fixed to the cover, and the current collector preferably has a welded portion formed in a shape except for a straight line parallel to a short side of the cover, and the welding pad is preferably formed to have a shape being along the welded portion.

With the configuration, a welding area can be set to be large, and strength obtained after welding can be improved.

As a shape of the welded portion, various shapes such as an arc-like shape, an inclined shape, a concave shape, and a convex shape are conceivable.

The welded portion and the welding pad preferably have inclined portions the thicknesses of which are gradually reduced as the inclined portions come close to each other.

With the configuration, the welded portion and an auxiliary welding portion can be easily melted to make it possible to improve workability.

A slit is formed in the current collector, and one of facing inner edges of the slit and the other are a welded portion and a welding pad, respectively.

With the configuration, not only an auxiliary welding portion need not be additionally prepared, but also alignment between the welded portion and the auxiliary welding portion is not required, so that the workability can be more improved.

The connection member may penetrate through the casing.

In this case, the connection member preferably penetrates through the casing with a gasket being interposed therebetween.

With the configuration, since the connection member and the cover have the gasket therebetween, the cover through which the connection member penetrates has excellent gastightness.

The connection member is preferably fixed to the casing by caulking.

In this case, a fixing position between the current collector and the casing is preferably different from a position at which the connection member penetrates through the casing.

With the configuration, due to the influence of vibration or the like, stress is not easily concentrated on the connection member, and positional deviation is effectively prevented to make it easy to maintain high gastightness.

The fixing position between the current collector and the casing is preferably set between the fixing position between the current collector and the power generating element and the position at which the connection member penetrates through the casing.

With the configuration, stress that intends to be concentrated on the connection member can be easily let out to an casing side, and positional deviation of the connection member is effectively prevented to make it possible to maintain high gastightness.

Furthermore, the fixing position between the current collector and the power generating element is preferably set between the position at which the connection member penetrates through the casing and the fixing position between the current collector and the casing.

With the configuration, the influence on the connection member from the power generating element due to vibration or the like is suppressed to more effectively prevent positional deviation of the connection member so as to make it possible to easily maintain high gastightness.

The connection member is configured by a flat plate and a shaft that projects from the center of the flat plate, penetrates through the cover with the gasket being interposed therebetween, and caulking-fixes the current collector, and a second gasket through which the shaft penetrates is preferably arranged between the casing and the current collector.

With the configuration, the casing is sandwiched with the two upper and lower gaskets to make it possible to further increase gastightness.

The casing has a substantially rectangular parallelepiped shape and includes a cover configuring one surface and a storage case configuring the other surfaces, the connection member may penetrate through the cover, and the current collector may be fixed to the cover.

Advantageous Effects of Invention

According to the present invention, since the connection member is connected to the current collector directly fixed to the casing, even though vibration or the like occurs, positional deviation or the like caused by concentration of stress on the connection member does not easily occur. Thus, a clearance is not easily formed between the connection member and the casing to make it possible to reduce the possibility of leaking gas from the inside.

BRIEF DESCRIPTION OF THE DRAWINGS

The foregoing and the other features of the present invention will become apparent from the following description and drawings of an illustrative embodiment of the invention in which.

DESCRIPTION OF EMBODIMENTS

Hereinafter, embodiments of the present invention will be described with reference to the accompanying drawings. In the following description, terms indicating specific directions and positions (including "above", "below", "side", "end", and the like) are used as necessary. These terms are used just for the purpose of easier understanding of the invention with reference to the drawings, and the meanings of the terms should not restrict the technical scope of the present invention. Moreover, the following description provides merely an essential example, and should not be intended to restrict the present invention, application targets, or usage thereof.

Figure 1:
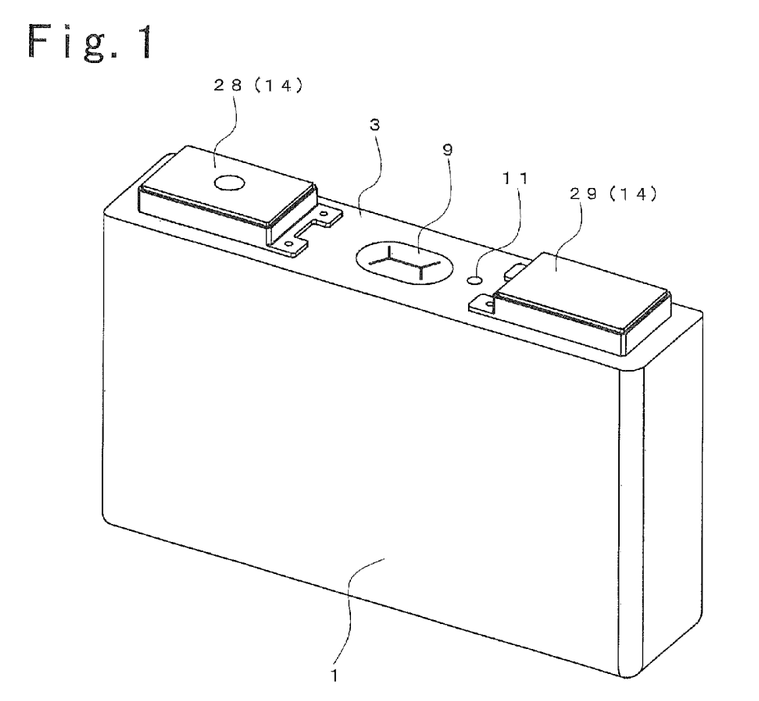
FIG. 1 is a perspective view of a battery according to an embodiment of the present invention.
Figure 2:
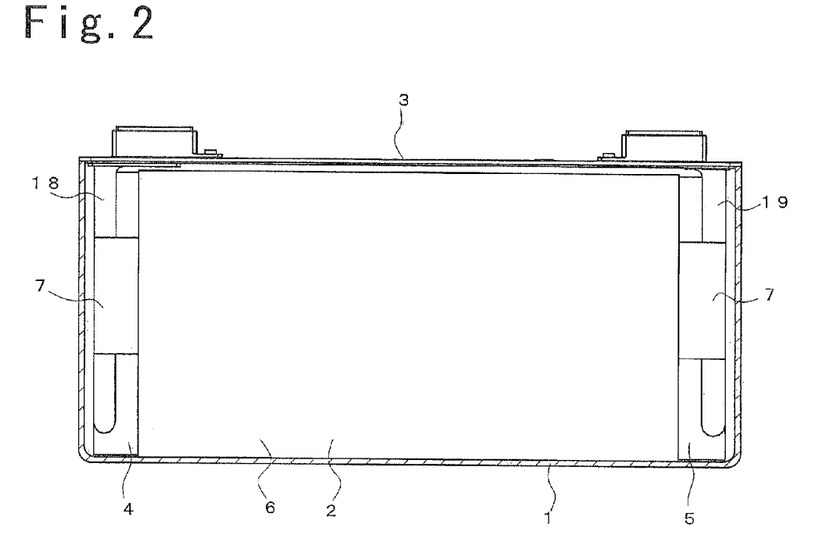
FIG. 2 is a front sectional view of the battery according to the embodiment of the present invention.
Figure 3:
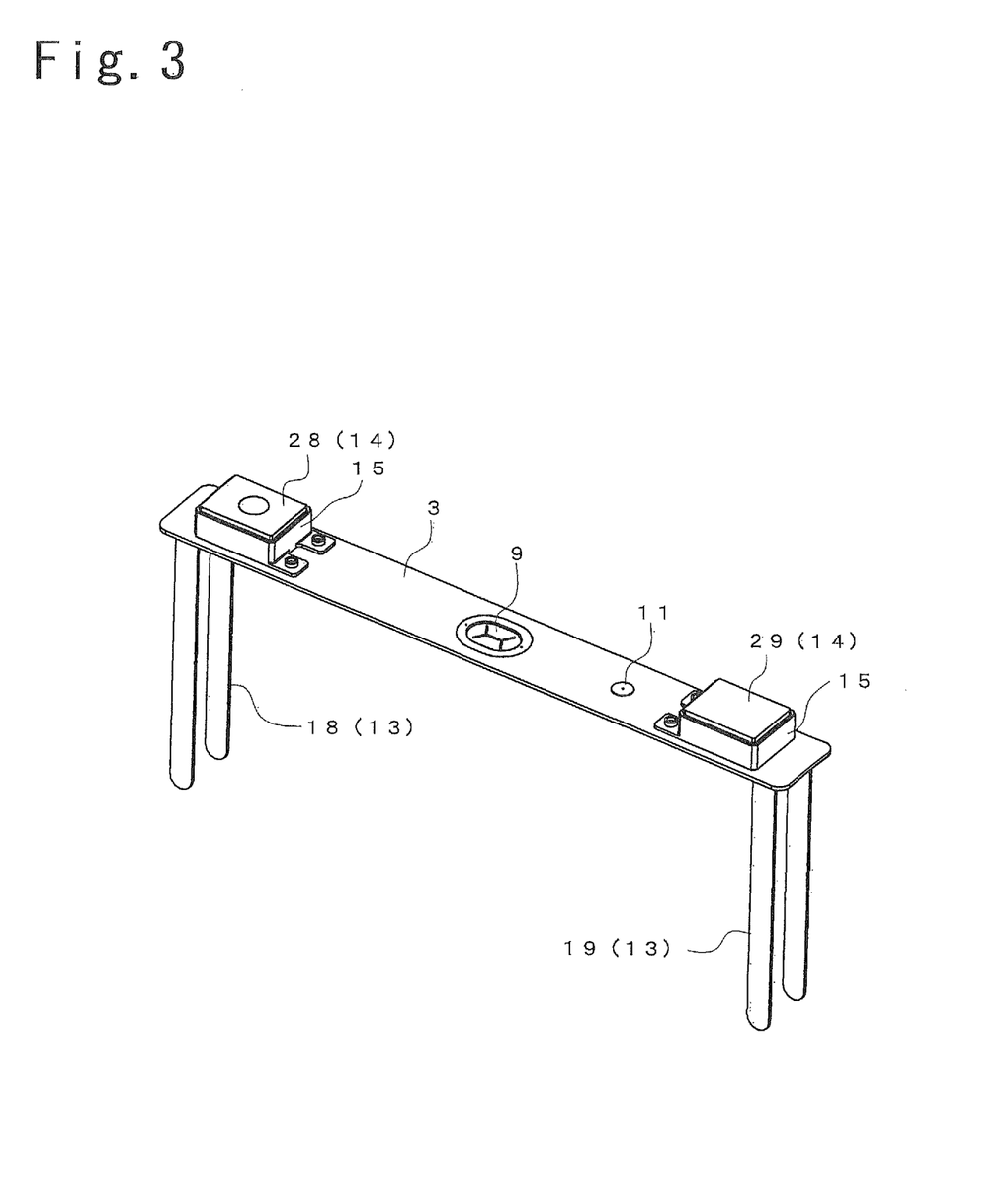
FIG. 3 is a perspective view, seen from above, of a cover shown in FIG. 1.

FIG. 1 shows a nonaqueous electrolyte secondary battery that exemplifies an electric storage element according to the present invention. As shown in FIG. 2, in the nonaqueous electrolyte secondary battery, a battery case (storage case) 1 houses a power generating element 2 and is sealed with a cover 3. In this example, the battery case 1 and the cover 3 configure a casing.

The battery case 1 has a rectangular parallelepiped shape with an open upper surface, and is made of aluminum, an aluminum alloy, or the like.

Although not illustrated in detail, the power generating element 2 includes a negative electrode 4 made of copper foil, a positive electrode 5 made of aluminum foil, a separator 6 made of a porous resin film and interposed between the negative electrode 4 and the positive electrode 5 similarly to a conventional power generating element. Each of these members has a band shape, and the negative electrode 4 and the positive electrode 5 are flat wound so as to be housed in the battery case 1 in a state where the positive electrode 4 and the negative electrode 5 are displaced with respect to the separator 6 oppositely in a widthwise direction. As to be described later, a negative current collector 18 is connected to the negative electrode 4 with a clip 7 being interposed therebetween, and a positive current collector 19 is connected to the positive electrode 5 with the clip 7 being interposed therebetween.

As shown in FIGS. 3 to 6, the cover 3 is made of a metal elongated plate in a rectangular shape in a planar view, and is provided, in the center thereof, with an opening 8 that has a substantially elliptical shape and is formed to be stepped from the upper surface. A safety valve 9 made of metal is fitted into the opening 8. The safety valve 9 is provided with a substantially H-shaped thin portion. The thin portion is torn in a case of an abnormal increase in internal pressure, so that the pressure can be decreased.

The cover 3 has one end provided with a liquid injection hole 10 having a small diameter, and the liquid injection hole 10 is configured to be closed by a plug 11 after liquid is injected.

The cover 3 is provided, on the lower surfaces of the two ends, with engagement receivers 12 protruding upward and each having a substantially rectangular shape in a planar view, respectively. In each of the engagement receivers 12, a shallow guide recess 12b is formed around the engagement receiver 12 except for one side of an engagement recess 12a on the lower-surface side. Moreover, a through hole 12c is provided in the center of a ceiling surface configuring each engagement recess 12a. A current collector 13 and an external terminal 14 as an example of the connection member are attached to each of the engagement receiver 12 and the guide recess 12b with a lower gasket 16 and an upper gasket 15 being interposed therebetween, respectively.

The cover 3 is provided, in the vicinity of each of the engagement receivers 12 and inside each of the engagement receivers 12, with lock projections 17 that project upward from two positions in the width direction of the cover 3. Each of the lock projections 17 has a cylindrical shape provided with a bottom, and is formed at the same time when the cover 3 is pressed. The upper gasket 15, which is to be described later, is locked to the respective lock projections 17, so as to achieve positioning in a rotational direction.

Figure 4:
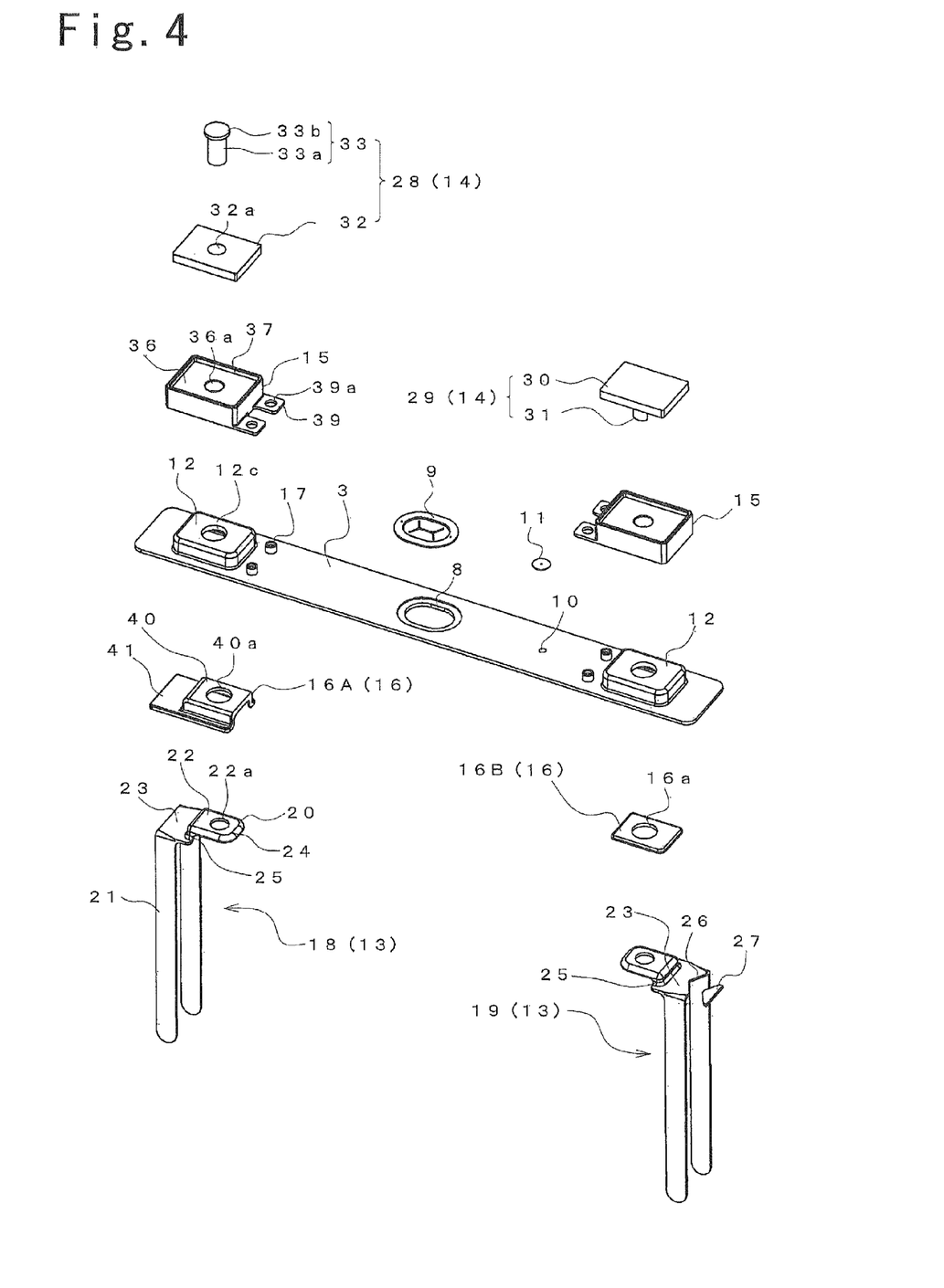
FIG. 4 is an exploded perspective view of FIG. 3.
Figure 5:
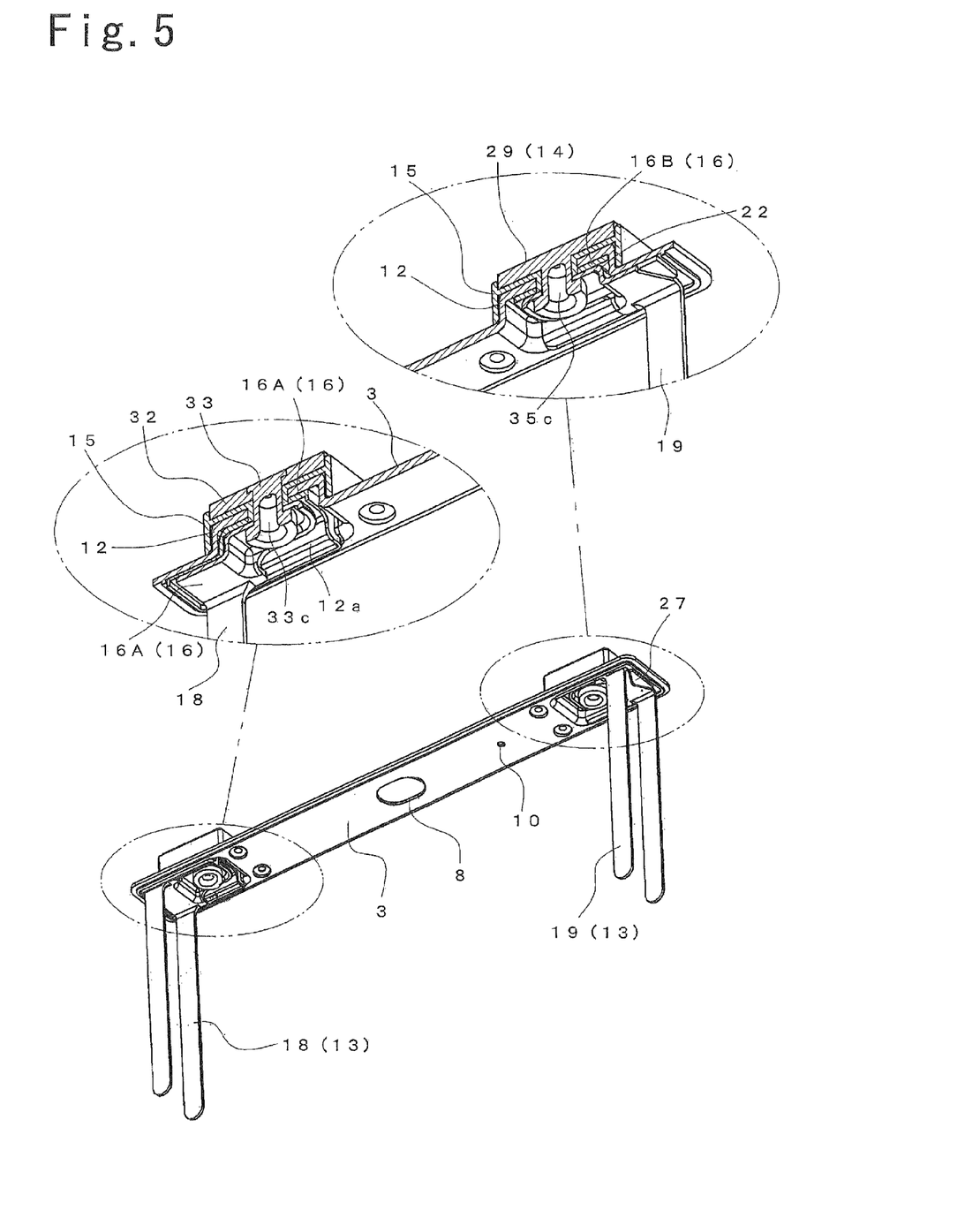
FIG. 5 is a perspective view, seen from bottom, of the cover shown in FIG. 1 and a partially enlarged sectional view thereof.
Figure 6:
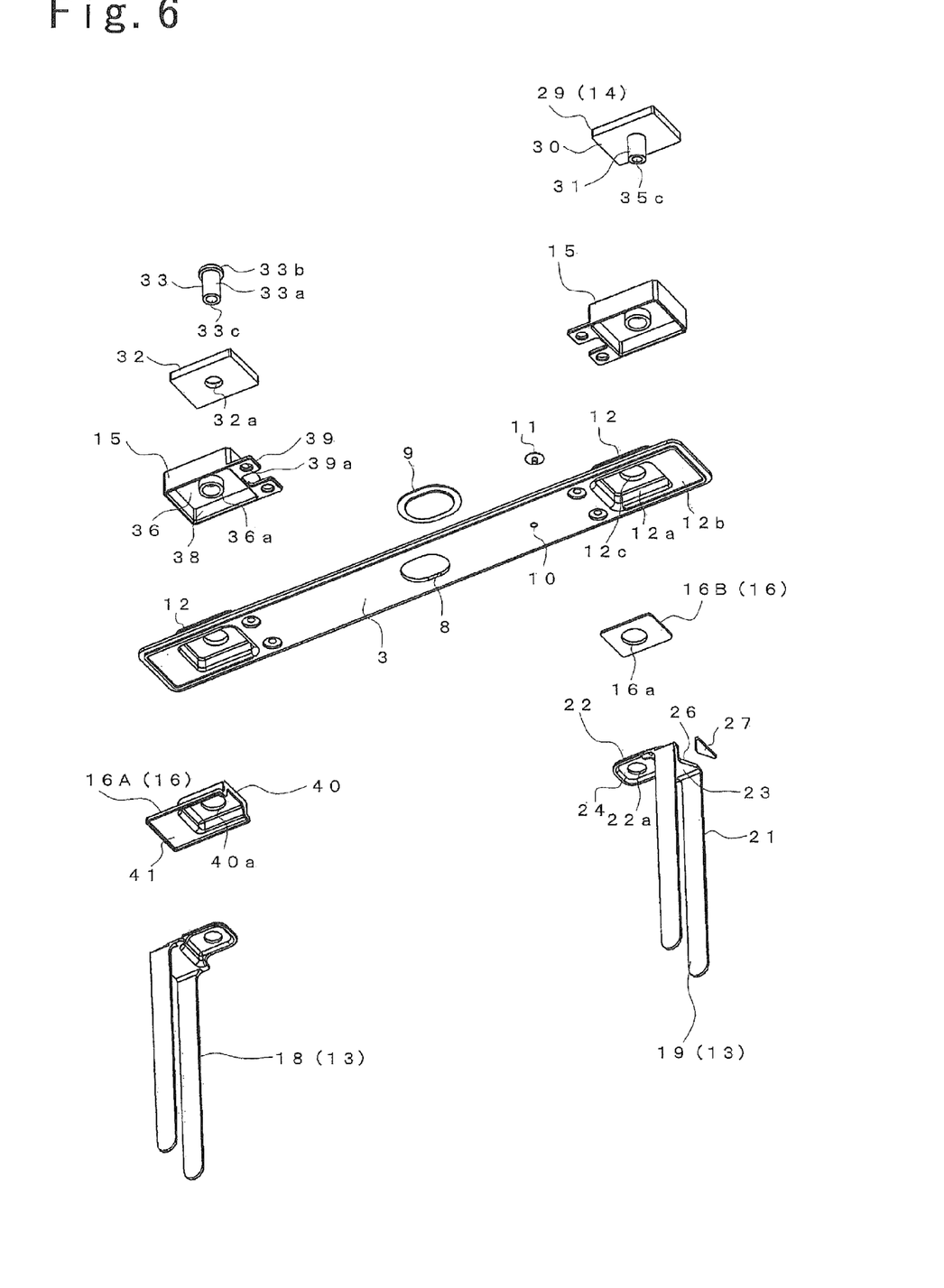
FIG. 6 is an exploded perspective view of FIG. 5.

The current collectors 13 are provided as the negative current collector 18 made of copper and the positive current collector 19 made of aluminum. Each of the current collectors 13 is formed by pressing a metal elongated plate, so as to be provided with a connection receiver 20 and legs 21 that extend from respective ends of the connection receiver 20. The connection receiver 20 is configured by a fitting portion 22 that is located in the recess of the cover 3 and a seat 23 that continuously extends from the fitting portion 22. The fitting portion 22 is made flat and is provided with a through hole 22a in the center thereof and has a peripheral edge provided with a guide edge 24 that extends perpendicularly except for one side provided continuously to the seat 23. The fitting portion 22 on the seat 23 side serves as a continuous portion 25 extending longer than the guide edge 24 to reach the seat 23. The guide edge 24 and the continuous portion 25 sufficiently enhance rigidity of the connection receiver 20 of each of the current collectors 13.

Figure 9:
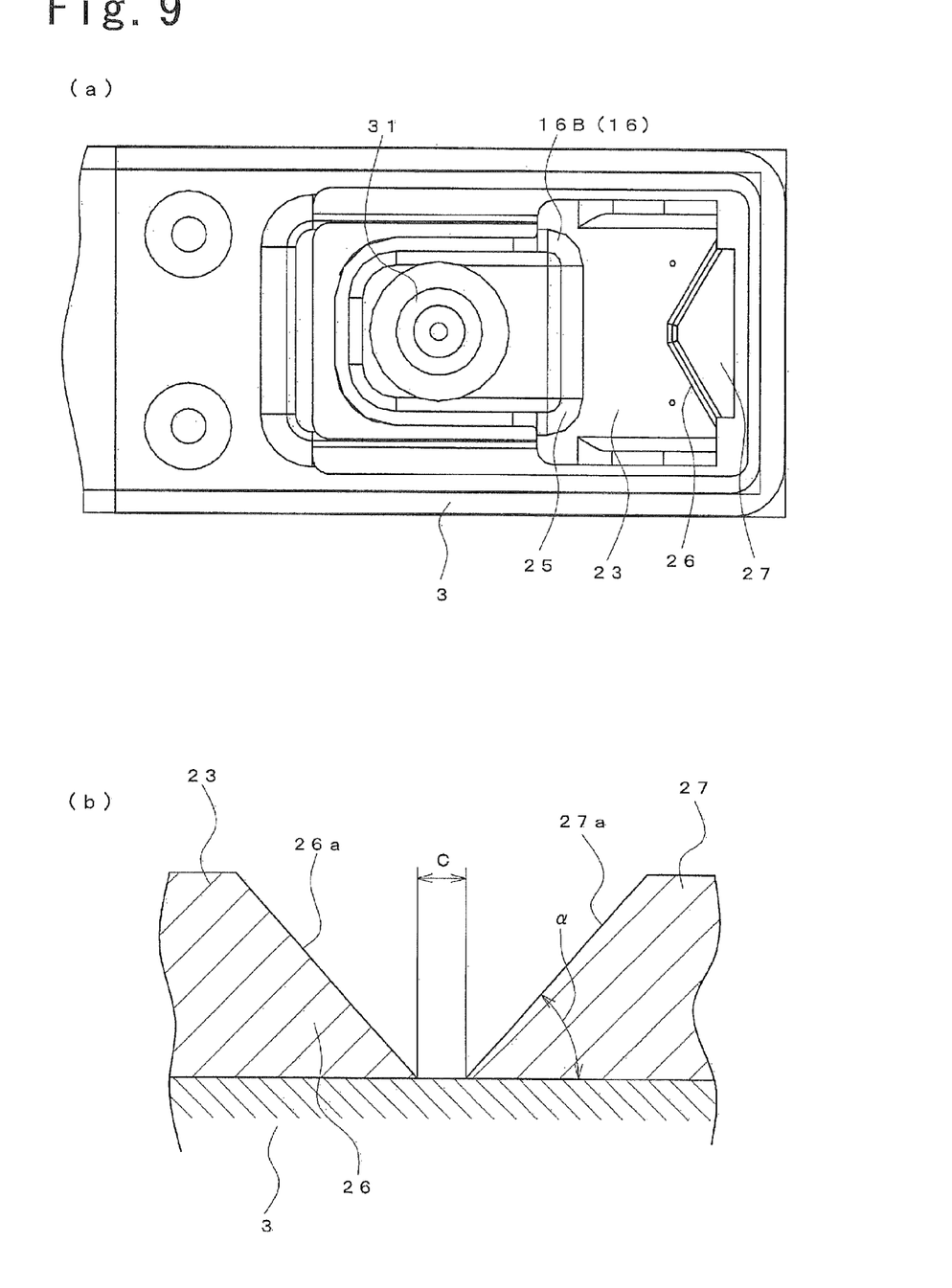
FIG. 9(a) is a bottom view showing the cover to which the current collector is fixed.
FIG. 9(b) is an enlarged sectional view of a welded portion of the cover.

The seat 23 has slightly different configurations in the negative current collector 18 and the positive current collector 19. More specifically, in the positive current collector 19, as shown in FIG. 9(a), a notch 26 formed by cutting, in a substantially triangular shape, an edge located on the opposite side of the continuous portion 25 is formed, unlike in the negative current collector 18. The notch 26, as shown in FIG. 9(b), is configured by an inclined surface 26a gradually projecting from top to bottom.

When the positive current collector 19 is welded on the cover 3 by a laser or the like, a substantially triangular welding pad 27 made of the same material as that of the positive current collector 19 is located near the positive current collector 19, and the positive current collector 19 is fixed by being melted together with the welding pad 27. Also on the welding pad 27, a portion provided along the notch 26 is configured by an inclined surface 27a.

Angles α of the inclined surfaces 26a and 27a with a planar surface (lower surface) of the cover 3 need only be 30° or more and less than 90°. A clearance between the inclined surfaces 26a and 27a (clearances C at boundary positions between the inclined surfaces and the planar surface of the cover 3) need only be set to 0.2 to 0.3 mm. In this manner, in welding performed by a laser, a laser beam is applied in a direction perpendicular to the planar surface of the cover 3 to make it possible to simultaneously melt both the inclined surfaces 26a and 27a.

In this manner, the inclined surfaces 26a and 27a are located to be adjacent to each other and gradually decrease in thickness toward the edges of the inclined surfaces 26a and 27a, respectively. For this reason, the inclined surfaces 26a and 27a are easily melted in welding on the cover 3 and melted in a large area. Thus, mechanical strength after solidification can be sufficiently enhanced.

A welding position of the positive current collector 19 on the cover 3 is set between a position where the external terminal 14 is caulking-fixed and a connection position (position near the inner surface of the battery case 1) between the positive current collector 19 and the positive electrode 5 of the power generating element 2. Thus, stress that intends to be concentrated on the external terminal 14 due to the influence of vibration or the like can be let out to the cover 3 and can suppress force acting from the power generating element 2. Thus, positional deviation of the external terminal 14 can be effectively prevented, and high gastightness can be maintained at the boundary portion where the external terminal 14 projects from the cover 3.

The notch 26 formed in the positive current collector 19 configures a welded portion according to the present invention, and the welding pad 27 configures an auxiliary welding portion.

The legs 21 extend perpendicularly from the two opposite edges of the seat 23 so as to be located along both side surfaces of the power generating element 2. The legs 21 are connected to the positive electrode 5 or the negative electrode 4 of the power generating element 2 with the clip 7 being interposed therebetween. Positional deviation is prevented by the clip 7 that is sandwiched between the opposite inner surfaces of the battery case 1.

The external terminals 14 are provided as a positive external terminal 28 and a negative external terminal 29. Each of the external terminals 14 is configured by a flat plate 30 and a shaft 31 extending downward from the center of the lower surface of the flat plate 30. A bus bar (not shown) is connected by welding to the upper surface (exposed surface) of the flat plate 30.

Figure 7:
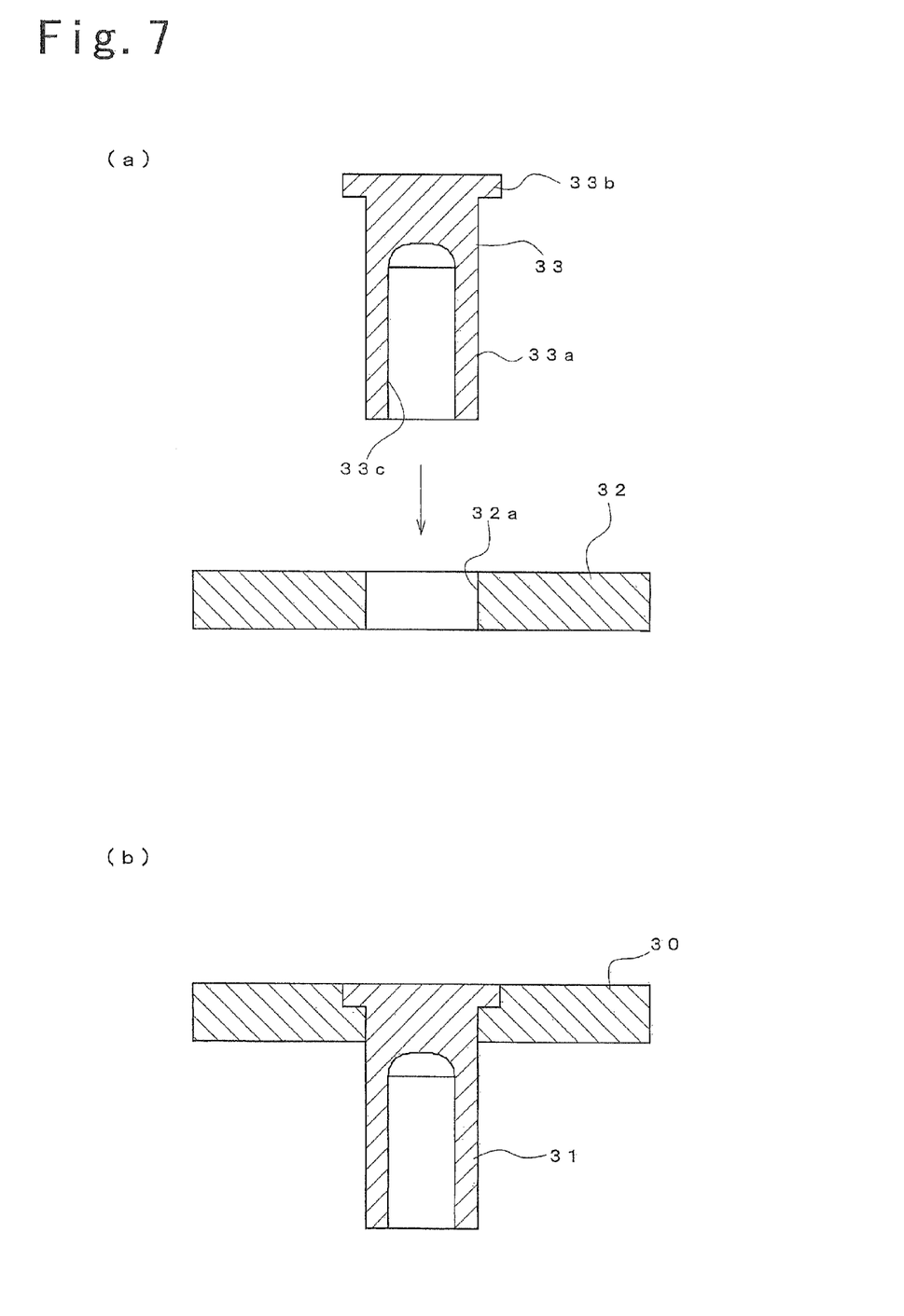
FIG. 7 is a sectional view showing a step of producing a negative external terminal in FIG. 4.

A negative external terminal 28, as shown in FIG. 7, can be formed by a plate-like portion 32 made of aluminum and having a rectangular shape in a planar view and a rivet 33 made of copper. More specifically, a shaft 33a of the rivet 33 is inserted into the a through hole 32a formed in the central portion of the plate-like portion 32, and a flange 33b is pressed into the through hole 32a by press working. The internal diameter of the through hole 32a of the plate-like portion 32 is just slightly larger than the external diameter of the shaft 33a of the rivet 33 and is sufficiently smaller than the external diameter of the flange 33b. Thus, by press fitting, the flange 33b widens the through hole 32a to set a pressure bonding state, the widened portion is pressure-bonded on the shaft 33a, and both the portions are integrated with each other. A circular recess 33c is formed at the center of the front-end surface of the shaft 33a of the rivet 33. After the shaft 33a is inserted into the through holes of the upper gasket 15, the engagement receivers 12 of the cover 3, the lower gasket 16, and the negative current collector 18, the negative external terminal 28 is caulking-fixed by widening the recess 33c such that these portions are sandwiched.

Figure 8:
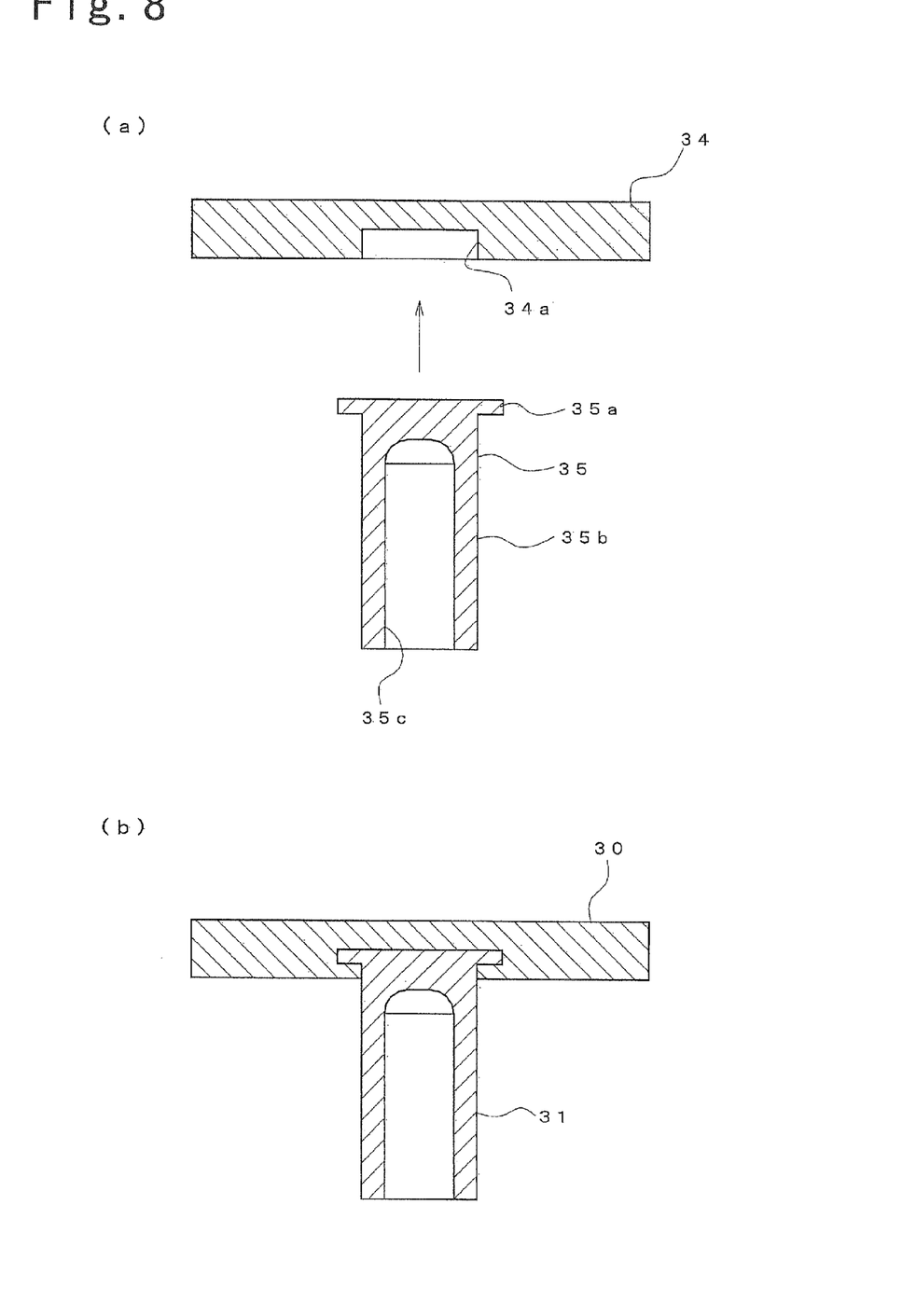
FIG. 8 is a sectional view showing another step of producing a negative external terminal in FIG. 4.

On the other hand, the entire positive external terminal 29 is made of aluminum as a whole, and the flat plate 30 and the shaft 31 are formed integrally with each other. A circular recess 35c is formed at the center of the front-end surface of the shaft 31. After the shaft 31 is inserted into the through holes of the upper gasket 15, the engagement receivers 12 of the cover, the lower gasket 16, and the positive current collector 19, the positive external terminal 29 is caulking-fixed by widening the recess 35c such that these portions are sandwiched.

The upper gasket 15 is made of a synthetic resin, and is configured such that the inner space of a frame having a rectangular shape in a planar view is divided by a partition 36 into an upper terminal holding recess 37 and a lower attachment recess 38. Tongue pieces 39 extend laterally from one of sides configuring an edge of a lower opening. Provided in the center of the partition 36 is a cylindrical portion 36a that extends downward from the ceiling surface. The cylindrical portion 36a is inserted into the through hole 12c in the engagement receiver 12 and is fitted into a through hole 40a in the lower gasket 16. Lock holes 39a are provided in the two tongue pieces 39, into which the lock projections 17 on the cover 3 are inserted, respectively. The upper gasket 15 is provided along the engagement receiver 12 that is located on the cover 3 and has a rectangular shape in a planar view, so that positional deviation of the upper gasket 15 can be prevented in the rotational direction by simply mounting the upper gasket 15 on the engagement receiver 12. In addition, the lock projections 17 are inserted respectively into the lock holes 39a, so as to securely prevent such positional deviation in the rotational direction.

The lower gasket 16 is made of a synthetic resin, has a rectangular plate shape in a planar view, and is provided, in the center thereof, with a through hole 16a. The lower gasket 16 has slightly different shapes in the negative electrode side and the positive electrode side.

A negative lower gasket 16A is configured by a protruding portion 40 located in the engagement recess 12a formed in the engagement receiver 12 of the cover 3 and a flat portion 41 continuously extending from the protruding portion 40. The protruding portion 40 has a shape being along an inner surface of the engagement recess 12a of the engagement receiver 12 except for one side of the engagement recess 12a, and is provided, in the central portion, with the through hole 40a. The flat portion 41 is located on the guide recess 12b of the engagement receiver 12. The negative lower gasket 16A is provided from the lower side of the engagement recess 12a configuring the engagement receiver 12 of the cover 3, and is held between the cover 3 and the negative external terminal 28. In this holding state, the negative external terminal 28 is electrically insulated from cover 3, and the through hole 12c formed in the engagement receiver 12 of the cover 3 is sealed together with the upper gasket 15.

On the other hand, a positive lower gasket 16B has a planar shape, is provided, in the central portion, with the through hole 16a, and is located in the engagement recess 12a configuring the engagement receiver 12. The positive lower gasket 16B, together with the upper gasket 15, seals the through hole 12c formed in the engagement receiver 12 of the cover 3.

According to the battery having the above configuration, since the exposed surface of the external terminal 14 is configured by a flat surface, a connecting operation for a bus bar (not shown) can be easily performed. The external terminal 14 can integrate the shaft 31, the upper gasket 15, the cover 3, the lower gasket 16, and the current collector 13 with each other in a manner such that the shaft 31 is merely penetrated through the upper gasket 15, cover 3, the lower gasket 16, and the current collector 13 and caulked at the front end. In this manner, the external terminal 14 can be easily produced by only pressing the rivet 33 into the plate-like portion 32. The configuration of the external terminal 14 is considerably simplified, and the battery can be easily produced at low costs.

Positional deviation in the rotational direction can be prevented by only mounting the attachment recess 38 of the upper gasket 15 on the engagement receiver 12 of the cover 3. Thus, when the shaft 31 of the external terminal 14 is inserted into the through holes of the upper gasket 15, the cover 3, the lower gasket 16, and the current collector 13 and caulking-fixed, the upper gasket 15 can be free from the positional deviation. For this reason, the workability of the series of assembling operations can be improved.

It is to be noted that the present invention is not limited to the configuration described in the above embodiment, but can be modified in various manners.

In the embodiment, the substantially V-shaped notch 26 is formed in the current collector 13, the substantially triangular welding pad 27 is located along the notch 26, and both the notch 26 and the welding pad 27 are melted to fix the current collector 13 on the cover 3 by welding. However, the configuration need not be always used, and welding can be performed in various modes.

Figure 10:
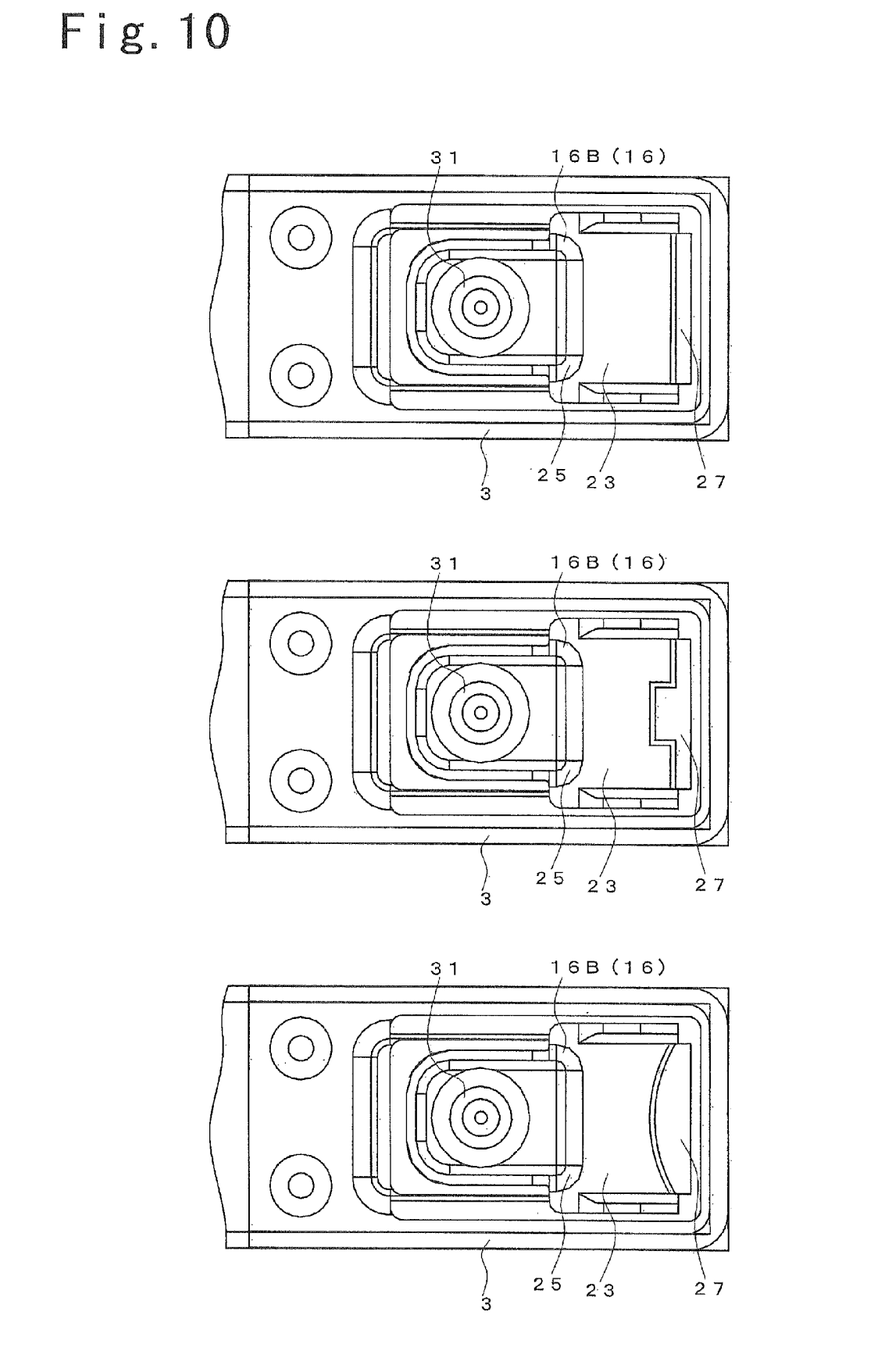
FIG. 10 is enlarged plan views of a portion where a current collector is welded on a cover according to another embodiment.

For example, as shown in FIG. 10(a), the current collector 13 may be still formed in a straight-line form without forming the notch 26 in the current collector 13. In this case, the welding pad 27 may have a rectangular shape in a planar view having an edge along the welding pad 27. According to this, a welding area is smaller than that in the case where the substantially V-shaped notch 26 is formed, and the current collector has a simple configuration and can be produced at low costs though the current collector is deteriorated in terms of strength.

As shown in FIG. 10(b), the current collector 13 may be configured such that the concave notch 26 is formed in the current collector 13 and the welding pad 27 is changed into a convex projecting portion 27b matched with the notch 26.

As shown in FIG. 10(c), the edge of the current collector 13 may have an arc-like concave shape, and the welding pad 27 may have an arc-like projecting shape matched with the arc-like concave shape. In this manner, a moving trace in welding can be sequentially smoothened while widening a welding area, and welding reliability can be improved.

Figure 11:
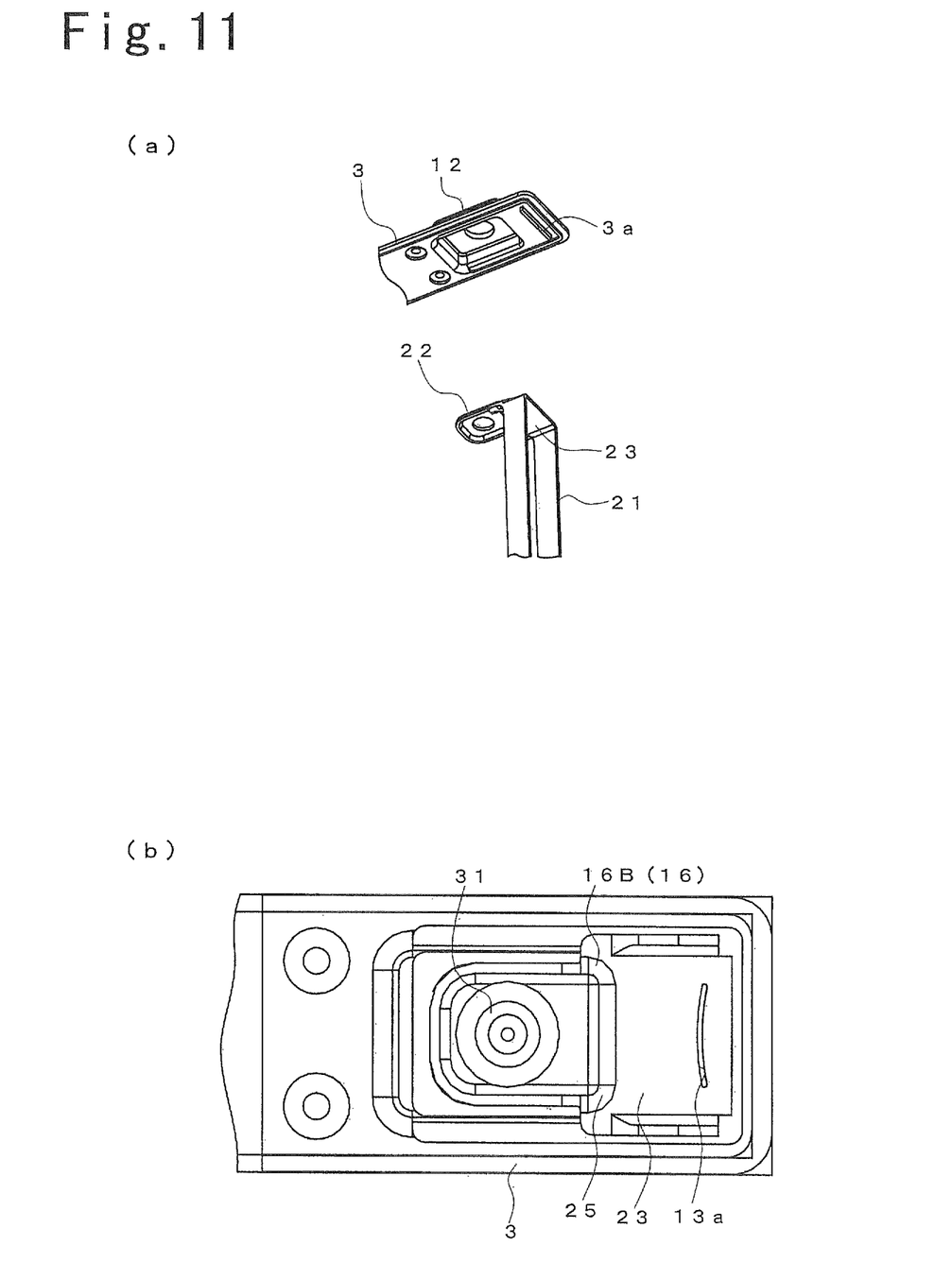
FIG. 11(a) is a partial perspective view of the portion where the current collector is welded on a cover according to still another embodiment.
FIG. 11(b) is an enlarged plan view of the portion where the current collector is welded on the cover according to still another embodiment.

As shown in FIG. 11(a), in place of the welding pad 27, the cover 3 may be provided with a projecting portion 3a having a shape depending on the current collector 13 as described above. According to this, the small welding pad 27 is not required, a problem of loss of the welding pad 27 is not posed, and workability of welding can be improved.

As shown in FIG. 11(b), in place of the welding pad 27, a slit 13a is formed in the current collector 13. One of the facing edges of the slit 13a may be functioned as a welded portion, and the other may be functioned as an auxiliary welding portion. As the shape of the slit 13a, various shapes such as a V shape, a U shape, and a crank-like shape can be employed. When the same inclined surfaces as described above are formed on the facing edges, respectively, a further excellent welding state can be obtained. When the inclined surfaces are formed simultaneously with press working for forming the current collector 13, a trouble of press working is not required. In this manner, since the welded portion and the auxiliary welding portion can be formed on the current collector 13, not only the welding pad 27 can be made unnecessary but also alignment is unnecessary, and welding workability can be further improved.

INDUSTRIAL APPLICABILITY

A welding structure of the current collector 13 in the battery according to the present invention, may be applied to various batteries such as a lithium ion battery and a lead storage battery.

Various modifications and alterations of the disclosure will become apparent to those skilled in the art without departing from the spirit and scope of the disclosure, which is defined by the accompanying claims.

The invention claimed is:

1. An electric storage element, comprising:
a casing;
a power generating element arranged inside the casing;
a current collector connected to the power generating element and directly welded to the casing; and
a connection member penetrating through the casing without a clearance and connected to the current collector,
wherein the current collector is fixed to the casing by welding,
wherein the current collector is fixed to the casing by welding together with a welding pad,
wherein the casing has a substantially rectangular parallelepiped shape and includes a cover configuring one surface and an electric storage element case configuring other surfaces,
wherein the connection member penetrates the cover,
wherein the current collector is fixed to the cover,
wherein the current collector includes a welded portion formed in a shape except for a straight line parallel to a short side of the cover, and
wherein the welding pad has a shape being along the welded portion.

2. The electric storage element according to claim 1, wherein the welding pad has an independent configuration.

3. The electric storage element according to claim 1, wherein the welded portion and the welding pad include inclined portions thicknesses of which are gradually reduced as the inclined portions come close to each other.

4. The electric storage element according to claim 1, wherein the connection member penetrates through the casing.

5. The electric storage element according to claim 4, wherein the connection member penetrates through the casing with a gasket being interposed therebetween.

6. The electric storage element according to claim 4, wherein the connection member is fixed to the casing by caulking.

7. The electric storage element according to claim 4, wherein a fixing position between the current collector and the casing is different from a position at which the connection member penetrates through the casing.

8. The electric storage element according to claim 7, wherein the fixing position between the current collector and the casing is set between the fixing position between the current collector and the power generating element and the position at which the connection member penetrates through the casing.

9. The electric storage element according to claim 8, wherein the fixing position between the current collector and the power generating element is set between the position at which the connection member penetrates through the casing and the fixing position between the current collector and the casing.

10. The electric storage element according to claim 1, wherein the connection member includes a flat plate and a shaft that projects from a center of the flat plate, penetrates the cover with a gasket being interposed therebetween, and caulking-fixes the current collector, and
wherein the electric storage element further comprises a second gasket arranged between the casing and the current collector, the shaft penetrating through the gasket.

11. The electric storage element according to claim 1, wherein the current collector includes a first region to which the connection member is connected and a second region directly welded to the casing.

12. An electric storage element, comprising:
a casing;
a power generating element arranged inside the casing;
a current collector connected to the power generating element and directly welded to the casing; and
a connection member penetrating through the casing without a clearance and connected to the current collector,
wherein the current collector is fixed to the casing by welding,
wherein the current collector is fixed to the casing by welding together with a welding pad, and
wherein a slit is formed in the current collector, one of facing inner edges of the slit and other of the edges respectively being a welded portion and a welding pad.

13. The electric storage element according to claim 12, wherein the casing has a substantially rectangular parallelepiped shape and includes a cover configuring one surface and an electric storage element case configuring other surfaces,
wherein the connection member penetrates the cover,
wherein the current collector is fixed to the cover, and
wherein the welding pad is configured by a part of the cover.

14. The electric storage element according to claim 12, wherein the casing has a substantially rectangular parallelepiped shape and includes a cover configuring one surface and a storage case configuring other surfaces,
wherein the connection member penetrates the cover, and
wherein the current collector is fixed to the cover.

15. An electric storage element, comprising:
a casing;
a power generating element arranged inside the casing;
a current collector connected to the power generating element and directly welded to the casing; and
a connection member penetrating through the casing without a clearance and connected to the current collector,
wherein the casing has a substantially rectangular parallelepiped shape and includes a cover configuring one surface and an electric storage element case configuring other surfaces, and
wherein the current collector includes a welded portion formed in a shape except for a straight line parallel to a short side of the cover.

16. The electric storage element according to claim 15, wherein the current collector is welded to the casing with a welding pad, and
wherein the welding pad has a shape being along the welded portion.

17. An electric storage element, comprising:
a casing;
a power generating element arranged inside the casing;
a current collector connected to the power generating element;
a connection member penetrating through the casing without a clearance and connected to the current collector; and
a gasket disposed between the current collector and the casing,
wherein the current collector comprises:
a first portion connected to the casing though the gasket; and
a second portion directly welded to the casing through a welding pad.

* * * * *